Sept. 20, 1938.  W. H. FRANKS  2,130,826

JOURNAL CAP FOR FISHING REELS

Filed April 21, 1937

Inventor

W. H. Franks

By C. A. Snow & Co.

Attorney.

Patented Sept. 20, 1938

2,130,826

UNITED STATES PATENT OFFICE 2,130,826

JOURNAL CAP FOR FISHING REELS

Willie H. Franks, Shreveport, La., assignor of one-half to Edmund M. Cieri, Shreveport, La.

Application April 21, 1937, Serial No. 138,241

1 Claim. (Cl. 308—171)

This invention relates to a lubricating device designed primarily for use in providing an oil reservoir for insuring an even and constant supply of oil at the bearings of a fishing line reel, thereby eliminating the necessity of frequently oiling the bearings, during a day of fishing or while in use.

An important object of the invention is to provide a device of this character which will insure a quantity of lubricating material being fed to the bearings at all times, thereby insuring an easy running reel, and at the same time increasing the life of the bearings and shaft of the reel, to the maximum.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
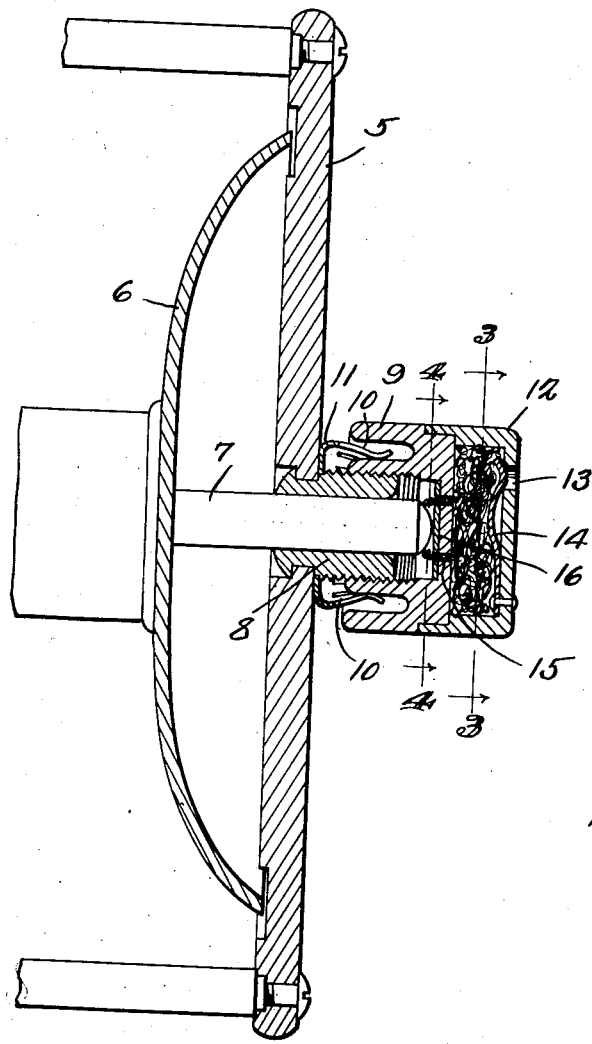
Figure 1 is a sectional view through one end of a reel, disclosing a lubricating device constructed in accordance with the invention, as secured to the bearing of the shaft of the reel.
Figure 2:
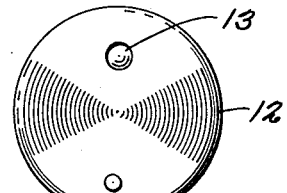
Figure 2 is an end elevational view of the lubricating device.
Figure 3:
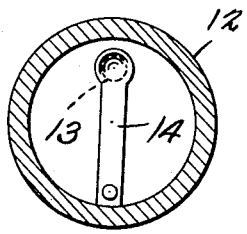
Figure 3 is a sectional view taken on line 3—3 of Figure 1.
Figure 4:
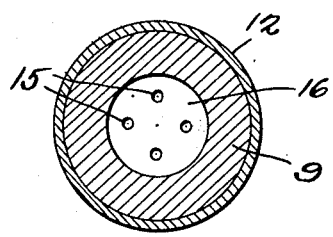
Figure 4 is a sectional view taken on line 4—4 of Figure 1.

Referring to the drawing in detail, the reference character 5 designates the frame of a fishing line reel, and the reference character 6, designates one end of a fishing line reel. The reference character 7 designates one end of the shaft of the reel, and as shown, the shaft is positioned within the bearing 8.

The bearing 8 is provided with external threads, to accommodate the internal threads of the inner section 9 of the lubricating device, the inner section 9 being formed with an annular groove to accommodate the spring fingers 10 of the member 11, designed to hold the lubricating device against rotary movement, under normal conditions.

The lubricating device also includes an outer section 12 which is fitted over one end of the inner section 9, and pressed into close engagement therewith, providing an oil-tight connection between the inner section 9 and outer section 12. This outer section 12, provides the reservoir of the lubricating device, and is designed to contain waste or wicking, for retaining the oil supplied to the reservoir.

An opening indicated by the reference character 13 establishes communication between the reservoir or outer section 12, and the atmosphere, so that the oil may be placed in the reservoir, to saturate the waste or wicking.

Mounted within the outer section 12, is a spring arm 14, which has a curved end portion adapted to close the opening 13, and prevent the lubricating material from passing from the reservoir, and at the same time afford means to allow the lubricating material to be positioned within the reservoir, when the spout of an oil can, is inserted in the opening 13.

Openings 15 are formed in the outer end of the inner section, and allow the lubricating material held in the reservoir, to find its way into the space between the outer wall of the inner section 9, and outer end of the shaft 7, maintaining the bearing 8 and shaft 7, thoroughly lubricated at all times.

The reference character 16 designates a thrust plate, which is constructed of hard steel, and against which the outer end of the shaft 7 engages.

Openings are provided in the thrust plate 16, so that the lubricating material may pass to the shaft and its bearing, as described.

Due to the construction shown and described, it will be seen that the lubricating device may be readily and easily positioned over the usual fishing line reel bearing, in lieu of the usual guard cap now employed in connection with these bearings, and when the reservoir has been filled with lubricating material, the bearing and its shaft will be thoroughly lubricated, eliminating the necessity of removing the usual guard cap, and frequently oiling the bearing and fishing line reel shaft, as is common in fishing line reel construction now in general use.

Having thus described the invention, what is claimed is:

The combination with a bearing having external threads, and the shaft operating in the bearing, one end of the shaft extending beyond the outer end of the bearing, of a lubricating device comprising a body portion threaded on the bearing, said body portion having an annular groove, spring fingers supported adjacent to the bearing and extending into the groove frictionally engaging one wall of the groove, restricting rotary movement of the bearing member, a thrust plate within the bearing, engaging the outer end of the shaft, a reservoir on the body portion, said body having openings through which lubricating material from the reservoir passes to the shaft, and said reservoir having an opening through which lubricating material may be passed into the reservoir.

WILLIE H. FRANKS.